March 17, 1970
M. A. VIGEN
3,500,936
CULTIVATOR ATTACHMENT
Filed Nov. 1, 1967
2 Sheets-Sheet 2
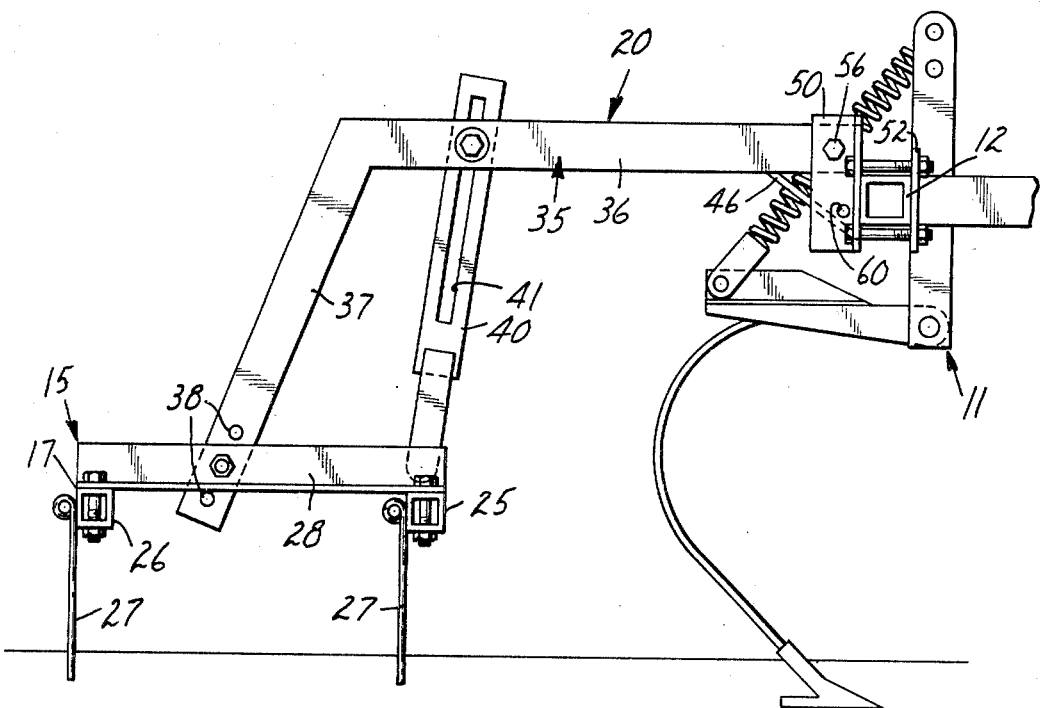
FIG. 2
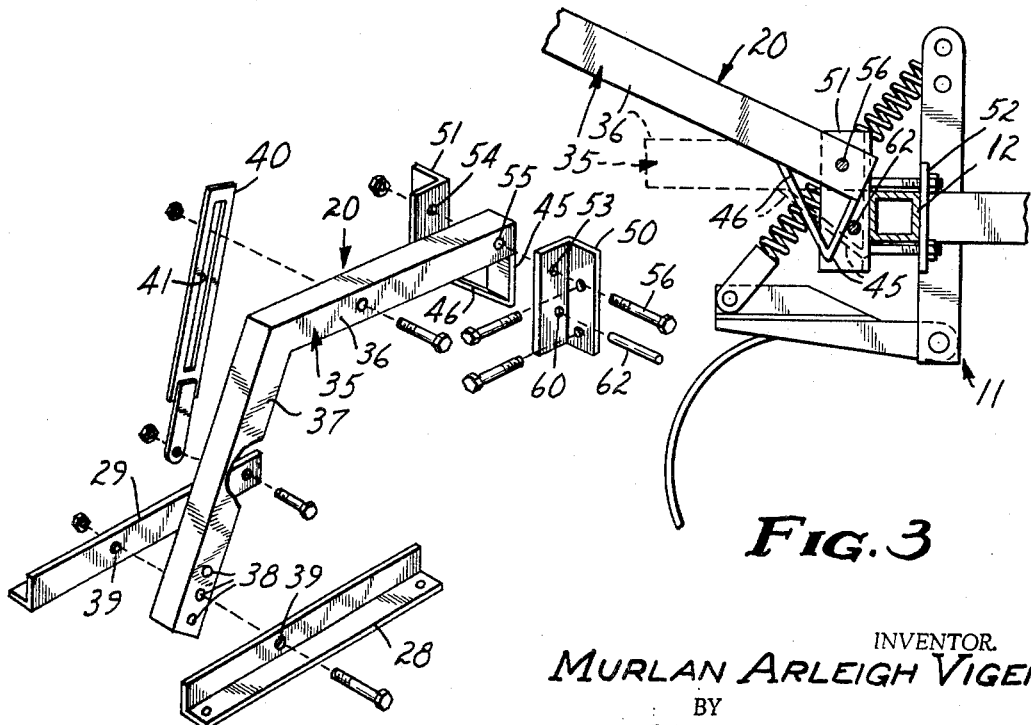
FIG. 3
FIG. 4
INVENTOR.
MURLAN ARLEIGH VIGEN
BY
Merchant & Gould
ATTORNEYS

United States Patent Office 3,500,936
Patented Mar. 17, 1970

3,500,936
CULTIVATOR ATTACHMENT
Murlan Arleigh Vigen, Portland, N. Dak. 58274
Filed Nov. 1, 1967, Ser. No. 679,766
Int. Cl. A01b 49/02, 35/22
U.S. Cl. 172—198                                  2 Claims

ABSTRACT OF THE DISCLOSURE

An attachment for connecting a harrow to a cultivator or the like having a rigid transverse beam including a plurality of rigid bars each having one end pivotally attached to the transverse beam and the other attached to the harrow. The end of the rigid bar pivotally attached to the transverse beam is connected to pivot about an axis parallel to but spaced from the axis of the transverse beam so that the pivotal movement is limited to engaging the harrow with the earth and disengaging it from the earth.

BACKGROUND OF THE INVENTION

Field of the invention

In the preparation of seed beds and the like for farming, it is common practice to harrow the soil after disking, cultivating, etc. In the present practice, the harrow is generally attached behind another farm implement so that two or more operations can be performed substantially simultaneously. The harrow is generally a relatively simple device not having wheels or the like, and, therefore, must be transported over any distances by some wheel mounted device, such as a wagon or the like. Most farm tractors are presently equipped with hydraulic or other means for raising the farm implement attached to the drawbar of the tractor, and devices not having wheels attached thereto can be simply raised, or disengage from the earth, and transported in this fashion.

Description of the prior art

In the prior art, a first implement, which may be a disk, a cultivator, etc. is attached to the drawbar of a tractor and a harrow is attached therebehind by means of chains hanging vertically from externally projecting beams and generally horizontal chains or other pivotally connected links. These prior art harrows generally require special equipment to attach them to other apparatus and in some instances are constructed to be attached to only one particular specially constructed piece of apparatus.

SUMMARY OF THE INVENTION

This invention pertains to a cultivator attachment and more particularly to an attachment for connecting a harrow behind substantially any cultivator or the like without requiring modifications thereof and includes a plurality of rigid members each having one end fixedly attached to the harrow and the other end pivotally attached to a rigid transverse beam of the cultivator of the like. The rigid members are attached for pivotal movement about an axis parallel with the longitudinal axis of the beam but spaced therefrom so that pivotal movement is limited by interference between each of the rigid members and the beam.

It is an object of the present invention to provide a new and improved cultivator attachment.

It is a further object of the present invention to provide an attachment for connecting a harrow behind a cultivator or the like which is simple to operate and manufacture and requires no additional modification of the cultivator or the like.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the several figures:

FIG. 2 is an enlarged end view of the apparatus as seen from the line 2—2 in FIG. 1;

FIG. 3 is a view similar to FIG. 2 illustrating the apparatus in a different position, parts thereof broken away; and FIG. 4 is an enlarged exploded view in perspective of the apparatus.

DESCRIPTION OF THE PREFERRED EMBODIMENT

Figure 1:
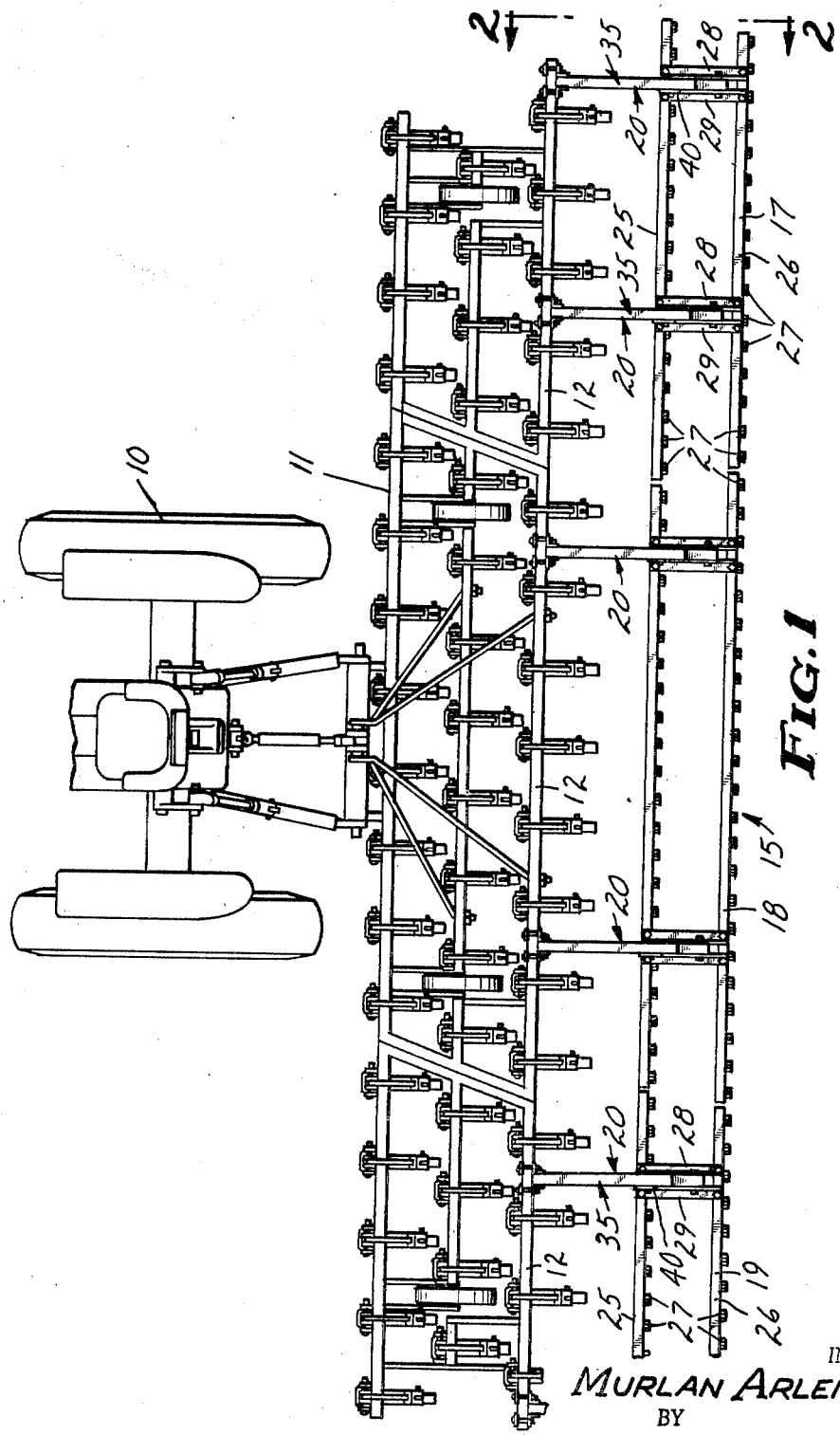
FIG. 1 is a view in top plan of the present attachment connecting a harrow to a cultivator.

Referring to the drawings, numeral 10 designates a tractor having a cultivator 11 attached therebehind in the usual manner. A multi-section cultivator 11 is illustrated so that the manner of connecting the present invention to a multi-section implement, as well as a single section implement can be clearly disclosed. It should be understood that the present invention is not limited to a cultivator of the type shown and the present invention can be connected to substantially any implement having a rigid transverse beam therein. The cultivator 11 has a plurality of beams therein and the present invention is attached to the cultivator 11 by two attachments each Although the rearmost beam of each of the sections is not a continuous beam, for purposes of this description the rearmost beam of all three sections of the cultivators 11 will be referred to as beam 12.

In the present embodiment a special harrow generally designated 15, is illustrated but it should be understood that a farmer might utilize the present attachment to connect an existing harrow to an existing cultivator if he so desires. The present harrow 15 is constructed of three sections designated 17, 18 and 19, as viewed from right to left in FIG. 1. Each of the harrow sections 17–19 is attached to the cultivator 11 by two attachments each of which is similar and generally designated 20. The two attachments 20 connect the harrow section 17 to the right section of the cultivator 11 for vertical and horizontal movement therewith. Two attachments 20 connect the center harrow section 18 to the center section of the cultivator 11 for horizontal and vertical movements therewith. Two attachments 20 (one of which is removed) connect the left harrow section 19 to the left section of the cultivator 11 for horizontal and vertical movement therewith. It should be understood that different numbers of the attachments 20 might be utilized to connect a harrow to a cultivator, depending upon the length of each and the number of sections therein.

Each of the sections 17–19 of the harrow 15 are somewhat similar, except for the size thereof and the spacing of the attachments 20, and, therefore, only the section 17 will be described in detail. The section 17 has two elongated transverse beams 25 and 26 lying substantially parallel and spaced apart so that the beam 25 is in front of the beam 26, relative to the cultivator 11. Each of the transverse beams 25 and 26 has a plurality of downwardly extending teeth 27 fixedly attached thereto. The transverse beams 25, 26 are fixedly attached together by a pair of angle irons 28 and 29 positioned to span the distance between the two beams 25 and 26 approximately perpendicular to the longitudinal axes thereof with one side of each angle iron 28 and 29 approximately horizontal and extending outwardly, and the other side extending approximately vertically upwardly. The two angle irons 28 and 29 are spaced apart so as to form a slot therebetween. It should be understood that the transverse beams 25 and 26 are fixedly held in place by a second pair of angle irons associated with the second attachment 20 but since each of the attachments 20 is similar, only a single attachment 20 will be discussed at this time.

An elongated rigid member generally designated 35 has one arm 36, which is normally horizontal in the operating position, and a second arm 37 extending rearwardly and downwardly from the arm 36 at an angle of approximately 120°. It should be understood that the present configuration of the rigid member 35 is simply for convenience and a great variety of configurations might be devised by those skilled in the art, all of which are intended to come within the scope of this invention. The lower rearmost end of the arm 37 has a plurality of openings 38 therethrough and is adapted to fit between the angle irons 28 and 29. Mating openings 39 through the angle irons 28 and 29 are aligned with one of the openings 38 and a bolt is placed therethrough to attach the rigid member 35 fixedly thereto. The remaining openings 38 are adjustments to change the vertical height of the harrow 15. The angle of the harrow 15 relative to the rigid member 35 is adjusted by means of an elongated member 40 having a longitudinal slot 41 extending a substantial portion of the length thereof. One end of the elongated member 40 is pivotally attached to the angle iron 29, and the other end is held in place by a bolt engaged through the slot 41 and an opening in the arm 36 of the rigid member 35, which bolt maintains the elongated member 40 at any position relative to the arm 36. Loosening the bolt and sliding the elongated member 40 so that the bolt is in a different part of the slot 41 varies the angle of the harrow 15 relative to the arm 36.

The forwardmost end of the arm 36 has a plate 45 rigidly attached thereto by welding or the like substantially perpendicular to the longitudinal axis thereof and extending downwardly below the lower edge of the arm 36 a distance somewhat greater than the width of the beam 12 of the cultivator 11. The lower end of the plate 45 is prevented from movement by a brace 46 fixedly attached between the plate 45 and the underside of the arm 36. A pair of angle irons 50 and 51 are fixedly attached in a substantially perpendicular relationship to the beam 12 of the cultivator 11 by a pair of bolts extending through one side of the angle iron 50 and 51 above and below the beam 12 and engaged in a plate 52 on the reverse side of the beam 12. The angle irons 50 and 51 each have a side extending outwardly parallel with the longitudinal axis of the beam 12 and a rearwardly extending side perpendicular to the beam 12 and parallel with the longitudinal axis of the arm 36. The angle irons 50 and 51 are spaced apart to form a slot therebetween adapted to receive the forward end of the arm 36. Openings 53 and 54 in the angle irons 50 and 51, respectively, mate with an opening 55 through the arm 36 adjacent the forward end thereof and a bolt 56 placed therein acts as a spindle about which the arm 36 is free to pivot. The openings 53, 54 and 55 lie along a line parallel with but spaced somewhat to the rear of the longitudinal axis of the beam 12. Because of the plate 45, the rigid member 35 is free to rotate in a clockwise direction, as viewed in FIGS. 2–4, but, once the arm 36 of the rigid member 35 is substantially horizontal, counter-clockwise movement of the rigid member 35 is prevented by the plate 45 butting against the beam 12.

Second openings, designated 60 in angle iron 50 and not shown in angle iron 51, are spaced somewhat below the openings 53 and 54 and are adapted to receive a pin 62 therein. If the pin 62 is engaged through the openings 60 in the angle irons 50 and 51 when the arm 36 of the rigid member 35 is substantially horizontal, the pin 62 passes between the brace 46 and the plate 45 and substantially prevents pivotal movement of the rigid member 35. If the pin 62 is engaged in the opening 60 of the angle irons 50 and 51, when the arm 36 is pivoted clockwise, as illustrated in FIG. 3, the pin 62 maintains the arm 36 in a generally upwardly inclined direction and the harrow 15 is maintained disengaged from the earth. In normal operation of the harrow 15, the pin 62 is not inserted in the opening 60 and the rigid member 35 is free to pivot about the bolt 56. Because of the limited pivotal movement of the rigid member 35 about the bolt 56, when the cultivator 11 is raised by the drawbar of the tractor 10, the harrow 15 is also raised.

Thus, it can be seen that the attachment 20 can be affixed to substantially any cultivator or the like having a transverse beam therein with no modifications thereof. Also, the harrow 15 can be quickly and easily attached to the cultivator 11 in a very simple operation. The attachment 20 can be adjusted so that the harrow 15 is not in engagement with the earth while the cultivator is in operation, if so desired.

While I have shown and described a specific embodiment of this invention, further modifications and improvements will occur to those skilled in the art.

What is claimed is:

1. An attachment for connecting a harrow to cultivators and the like having a rigid transverse beam comprising:
   (a) a plurality of elongated rigid members;
   (b) adjustable means connected to one end of each of said rigid members for fixedly attaching a harrow thereto in a generally downwardly extending relationship, said adjustable means being adjustable to vary the angle at which the harrow extends downwardly relative to each rigid member;
   (c) support members fixedly attached to the beam of a cultivator or the like defining a plurality of openings each adapted to receive the other end of one of said rigid members;
   (d) spindles extending through openings in each of said rigid members adjacent said other end thereof and perpendicular to the longitudinal axis of said rigid members and through mating openings in said support members to provide relative pivotal movement between said rigid members and said support members, the axes of said spindles being substantially parallel with the longitudinal axis of said transverse beam but spaced therefrom;
   (e) stop means secured to said other end of said rigid members and engaging said transverse beam when said harrow is in an operative position to prevent relative pivotal movement of said rigid members and said attached harrow in a downward direction; and
   (f) second openings in said support members spaced from the mating openings for receiving pins therein to engage said stop means when the harrow is in a second position spaced vertically upwardly from the operative position to prevent relative pivotal movement of said rigid members and said attached harrow in a downward direction.

2. An attachment as set forth in claim 1 wherein the adjustable means includes slotted members extending between and removably attached to the harrow and each of the rigid members.

References Cited

UNITED STATES PATENTS

| | | | |
|---|---|---|---|
| 1,957,991 | 5/1934 | Bloodworth | 172—763 X |
| 3,294,180 | 12/1966 | Bergmann et al. | 172—197 |
| 3,314,485 | 4/1967 | Godbersen | 172—142 X |

FOREIGN PATENTS 1,360,746  4/1964  France.

ROBERT E. PULFREY, Primary Examiner

S. C. PELLEGRINO, Assistant Examiner

U.S. Cl. X.R.

172—740, 763